(12) United States Patent
Sun et al.

(10) Patent No.: US 6,243,277 B1
(45) Date of Patent: Jun. 5, 2001

(54) BI-DIRECTIONAL DC TO DC CONVERTER FOR ENERGY STORAGE APPLICATIONS

(75) Inventors: Jian Sun, Cedar Rapids; Daniel E. Jenkins, Anamosa; Brent C. Peterson, Cedar Rapids, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/565,390

(22) Filed: May 5, 2000

(51) Int. Cl.$^7$ ............................ H02M 3/335; G05F 1/445
(52) U.S. Cl. .............................................. 363/65; 323/222
(58) Field of Search ...................... 363/16, 65; 323/222, 323/224, 282, 283, 284, 285

(56) References Cited

U.S. PATENT DOCUMENTS

| | | | | |
|---|---|---|---|---|
| 4,736,151 | * | 4/1988 | Dishner | 323/224 |
| 4,801,859 | * | 1/1989 | Dishner | 323/224 |
| 5,404,092 | * | 4/1995 | Gegner | 323/207 |
| 6,069,804 | * | 5/2000 | Ingman et al. | 363/21 |

OTHER PUBLICATIONS

LTC 1625, −5V/4.5A Positive to Negative Converter, 1999 Linear Databook, Volume VII, Linear Technology Corp., p. 4–606.

* cited by examiner

Primary Examiner—Adolf Deneke Berhane
(74) Attorney, Agent, or Firm—Nathan O. Jensen; Kyle Eppele; J. P. O'Shaughnessy

(57) ABSTRACT

A bi-directional energy storage module and method of operation is disclosed. The converter includes an inductive component, an energy storage element, two diodes and two switches. One switch is positioned in a first sub-circuit between an input voltage source and the inductive component and the other switch is positioned in a second sub-circuit between the inductive component and the energy storage element. The inductive component can be an inductor or a transformer. The energy storage element can be a battery or a capacitor. A hysteretic control structure can be used to activate and control the charging and discharging modes of operation. Voltage across the energy storage element and current through the inductive component are monitored. The switches are controlled to keep the monitored parameters within established bounds. Inrush current problems are eliminated and simple gate drive mechanisms are facilitated. The invention can be used in battery charging and discharging applications. The invention can also be used in an energy storage module of a system providing an uninterrupted power supply.

28 Claims, 6 Drawing Sheets

BI-DIRECTIONAL DC TO DC CONVERTER FOR ENERGY STORAGE APPLICATIONS

FIELD OF THE INVENTION

The present invention generally relates to an improved DC to DC converter circuit, more particularly relates to a bi-directional DC to DC converter, and even more particularly relates to a DC to DC converter capable of both charging and discharging an energy storage component and capable of providing an uninterrupted supply of operating power to a system.

BACKGROUND OF THE INVENTION

DC to DC power converters accept an input voltage and convert it to a variable or fixed output voltage. They are used, for example, in consumer, industrial, aerospace and telecommunications applications. Some types are used in the energy storage modules of sensitive or critical electronic equipment.

Energy storage modules are often used to provide a backup supply voltage. A DC to DC power converter is used in these modules to transfer power from a primary power source to a storage component. When the system's primary power input is lost, the stored energy is supplied by the energy storage module to prevent, for a time, a disruptive shut off.

One type of known unidirectional DC to DC converter is a buck converter. In a buck converter, the input voltage is always greater than the output voltage. In a second type of uni-directional DC to DC converter, called a boost converter, the input voltage is always less than the output voltage. In yet a third type of converter, the buck-boost converter, an output voltage either greater than or less than the input voltage can be obtained.

A drawback of uni-directional converters, as far as their use in energy storage modules is concerned, is that their electrical circuits are not capable of bi-directional operation. They can operate in a charging mode or a discharging mode, but they cannot be switched between the two modes. If it is desired to include both functionalities, two circuits, one for charging and one for discharging, are required. This increases the size, complexity and expense of the converter.

FIG. 1 depicts a known bi-directional DC to DC converter. The inductive component of this converter receives an input current from the $V_1$ input even when the left-most switch is open. Such converters have a large inrush current at start up and are difficult to control. In addition, a large duty cycle variation in both the charging and discharging modes causes them to be inefficient.

FIG. 2 depicts a known bi-directional full bridge DC to DC converter used for high voltage applications. This converter, however, requires eight switch components. As a result, it is larger and more complex than is desired.

Consequently, there exists a need for a smaller, more efficient bi-directional DC to DC converter. Further, there exists a need for a user-definable, bi-directional DC to DC converter, having a faster response time, no inrush current problem, and suitable for uninterrupted power supply applications.

SUMMARY OF THE INVENTION

It is an object of the present invention to provide an improved bi-directional DC to DC converter and control structure for an energy storage application.

It is a feature of the present invention to utilize a circuit containing two separate paths, one for a charging application and the other for a discharging application.

It is an advantage of the present invention to enable construction of an energy storage module having a small size and high efficiency.

It is another object of the present invention to provide a user-definable bi-directional energy storage module that does not have an inrush current.

It is another feature of the present invention to utilize a control structure for controlling the bi-directional DC to DC converter.

It is another advantage of the present invention to provide a controlled and definable charging and discharging system.

It is yet another object of the present invention to provide a bi-directional energy storage module for an energy storage application storing energy at a voltage that is much higher than the input voltage.

It is yet another feature of the present invention to utilize a circuit containing two separate paths and a transformer.

It is yet another advantage of the present invention to provide a controlled and definable charging and discharging system that does not have an inrush current.

The present invention involves an improved bi-directional energy storage module and a method for using and controlling such. It is carried out in a controlled, "inrush-less" manner in the sense that there is no inrush current when the circuit is first activated. The invention has several useful applications, including capacitor charging and discharging and also battery charging or discharging as utilized in an energy storage module of an uninterrupted power supply.

BRIEF DESCRIPTION OF THE DRAWINGS

The invention may be more fully understood by reading the following description of the preferred embodiments of the invention, in conjunction with the appended drawings wherein.

DETAILED DESCRIPTION

In many electrical systems it is desirable to have an uninterrupted supply of electrical power. Equipment containing computerized components, for example, can malfunction, lose data, shut down or be damaged if there is even a momentary loss of power. Indeed, in several applications, provision of an uninterrupted power supply is critical. The primary, engine-generated, power supply in a commercial aircraft, for example, is backed up by a battery power supply. If the primary power system fails, the secondary, battery-powered system must provide an uninterrupted supply of power to critical aircraft systems such as flight control and flight management.

Figure 1:
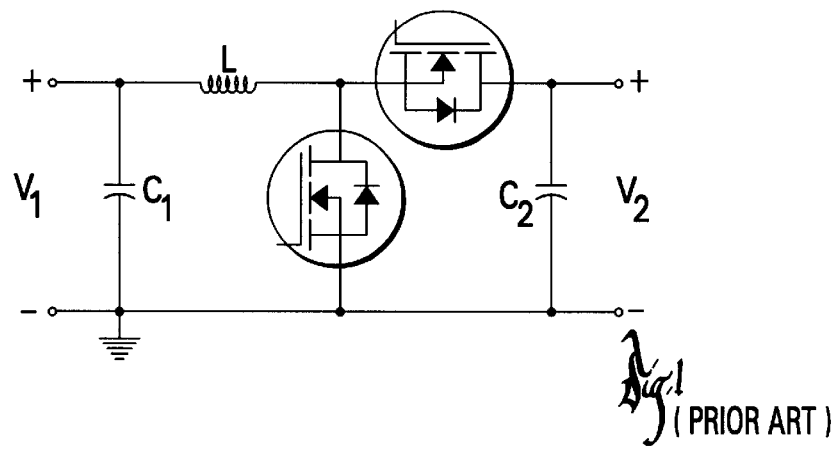
FIG. 1 is a schematic representation of a known bi-directional DC to DC converter.
Figure 2:
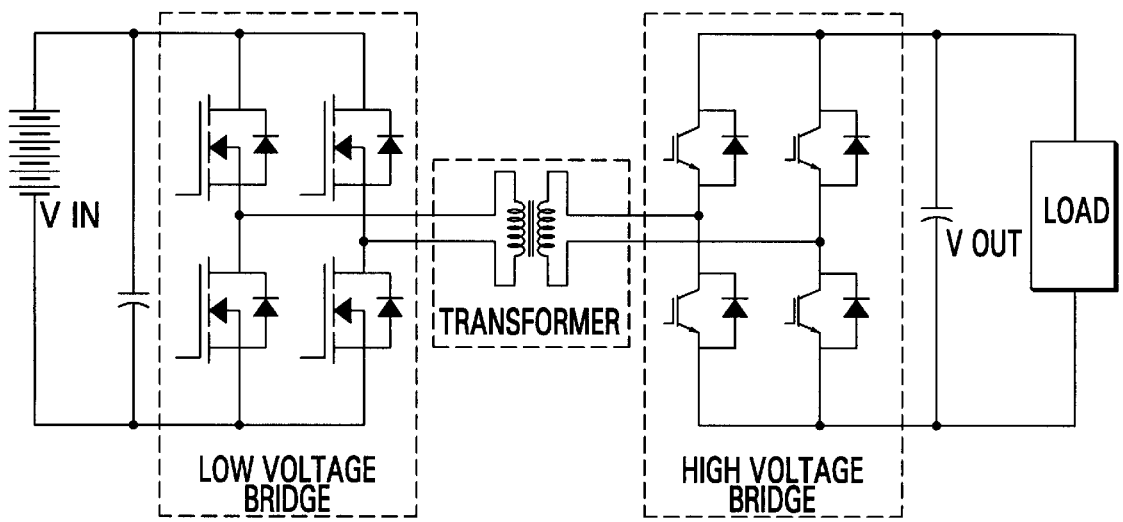
FIG. 2 is a schematic representation of a known bi-directional full bridge DC to DC converter.
Figure 3:
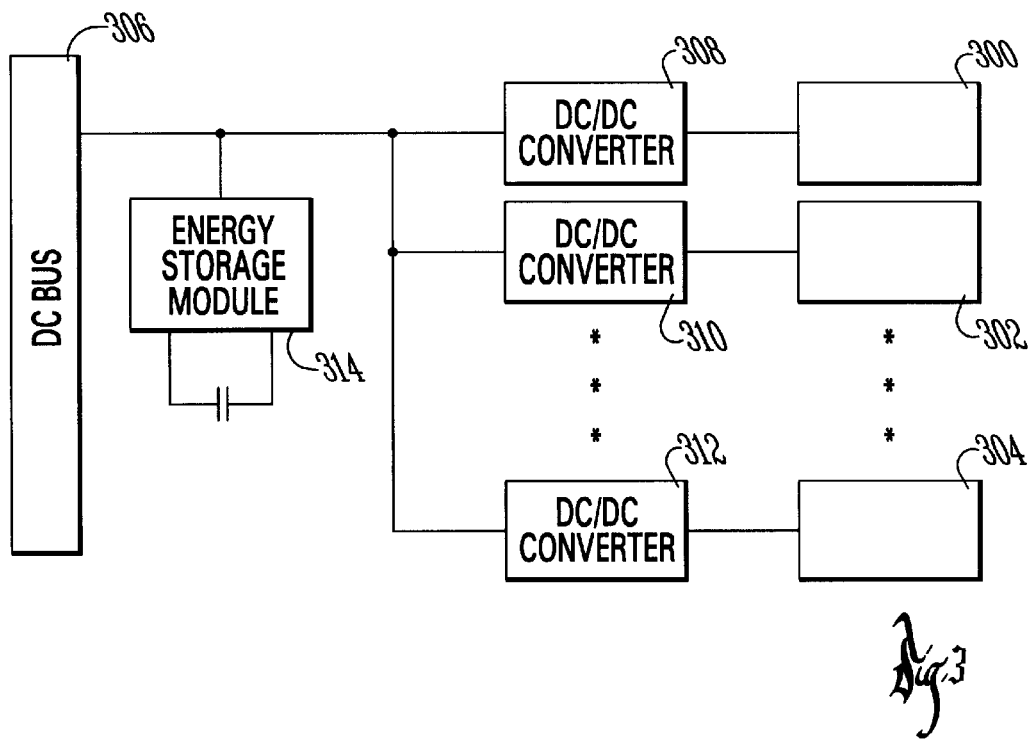
FIG. 3 is a block diagram representation of an application having a parallel connection framework and an energy storage module incorporating the teachings of the present invention.

FIG. 3 depicts a parallel connection structure including the teachings of the present invention. In this embodiment, a plurality of electronic subsystems 300, 302, 304 are coupled to a DC Bus 306 via their respective DC to DC converters 308, 310, 312. In an aviation application, for example, the subsystems 300, 302, 304 may include flight control, flight management, flight communication and other such critical subsystems. An energy storage component or module 314 is coupled to the DC to DC converters 308, 310, 312 and the DC Bus 306. The energy storage module 314 includes a bi-directional DC to DC converter.

It is to be appreciated that structures other than that depicted in FIG. 3 can be used with the present invention. For example, different numbers of DC to DC converters 308, 310, 312 or different numbers of electronic subsystems 300, 302, 304 can be included. Some or all of the electronic subsystems 300, 302, 304 may not require a dedicated DC to DC converter 308, 310, 312. Another structure includes more than one energy storage module 314. Yet another structure, for example, includes only a DC voltage supply, an energy storage module 314 and an electronic subsystem. Various structures are contemplated and are considered to be within the scope of the present invention.

In operation, when the primary power supply is functioning, the energy storage component or module 314 is charged from the DC Bus 306. When the DC Bus 306 voltage falls below a specified level, the bi-directional DC to DC converter of the energy storage module 314 is switched from a charging to a discharging mode and an uninterrupted regulated voltage is maintained for the plurality of DC to DC converters 308, 310, 312. In one application, for example, the DC Bus 306 and the energy storage module 314 cooperate to maintain an uninterrupted voltage of 28 volts. Other applications will have different voltage levels. Each of the plurality of DC to DC converters 308, 310, 312 then converts the supplied voltage to the level required for the subsystem 300, 302, 304 to which it is coupled.

Figure 4:
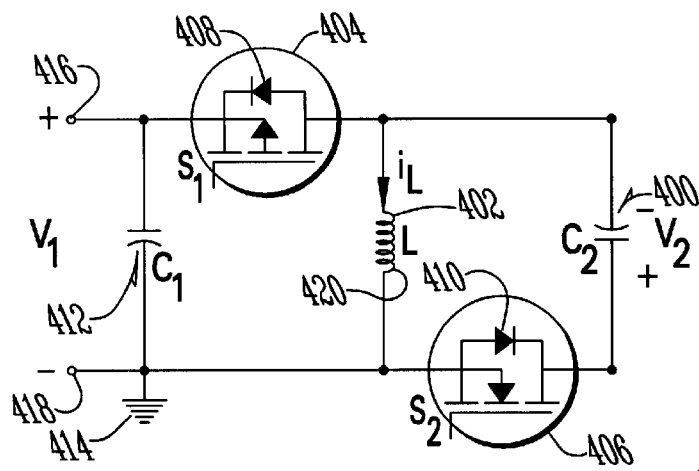
FIG. 4 is a schematic representation of an embodiment of the bi-directional DC to DC converter of the present invention.

FIG. 4 depicts a schematic diagram of an embodiment of the bi-directional DC to DC converter circuit of the present invention. The circuit includes a capacitor ($C_2$) 400 for storing energy, an inductor (L) 402, two switches ($S_1$, $S_2$) 404, 406 and two diodes 408, 410. A filtering capacitor ($C_1$) 412 is also depicted. The circuit further includes a connection to a common reference point 414, and a power source connector structure having a positive direct current supply terminal or lead 416 and a negative direct current supply terminal or lead 418. It will be appreciated that various known design techniques, such as placing multiple components in parallel, etc., can be applied to any of the embodiments disclosed throughout this specification and in FIGS. 4, 8 and 9 in order to meet the demands of the particular application at hand.

In one embodiment, switch $S_1$ 404 is a P-channel Metal-Oxide-Semiconductor Field-Effect Transistor (MOSFET) and switch $S_2$ 406 is an N-channel MOSFET. The component orientation of FIG. 4 has the added benefit of permitting the use of simple gate drive mechanisms. For example, the P-channel MOSFET can be driven through a small gate transformer while the N-channel MOSFET can be driven directly with reference to the common reference point. It will be appreciated, however, that other types of switches can also be used in the circuits depicted and described throughout this specification. For example, Bipolar Junction Transistors (BJTs), Insulated Gate Bipolar Transistors (IGBTs), MOS Controlled Thyristors (MCTs) and Gate Turn-Off thyristors (GTOs) can be used for the $S_1$ 404 and $S_2$ 406 switches. Accordingly, the term switch is used in a broad sense to include all such types of appropriate switch components and not just the switches depicted in the figures, or listed herein, for illustrative purposes.

The switches 404, 406 can alternatively be located at different locations in the circuit. For example, switch $S_1$ 404 and its related diode 408 can be located between the negative direct current supply terminal 418 and the inductor 402. Similarly, switch $S_2$ 406 and its related diode 410 can be located between the negative plate of the storage capacitor $C_2$ 400 and the inductor 402.

The two diodes 408, 410 are depicted as body diodes of the switches 404, 406 in FIG. 4. These diodes, however, need not be included as an integrated feature of the switch. One or both of the diodes 408, 410 may, for example, be a separate component that is also connected in parallel with its respective switch 404, 406. In other related embodiments, additional diodes can be connected in parallel with one or both switches 404, 406 to improve the efficiency of the converter.

Figure 8:
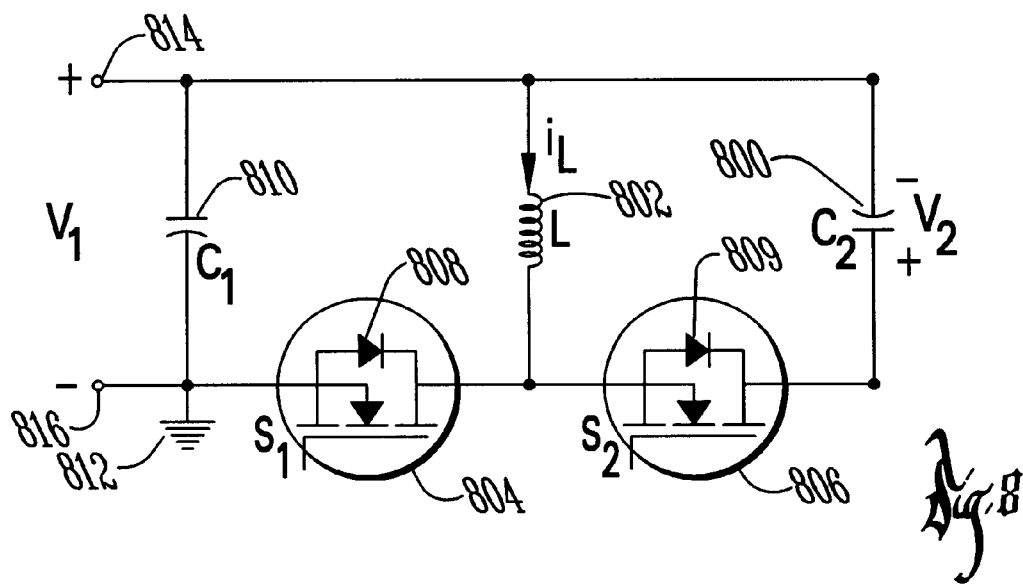
FIG. 8 is a schematic representation of an additional embodiment of the bi-directional DC to DC converter of the present invention.
Figure 9:
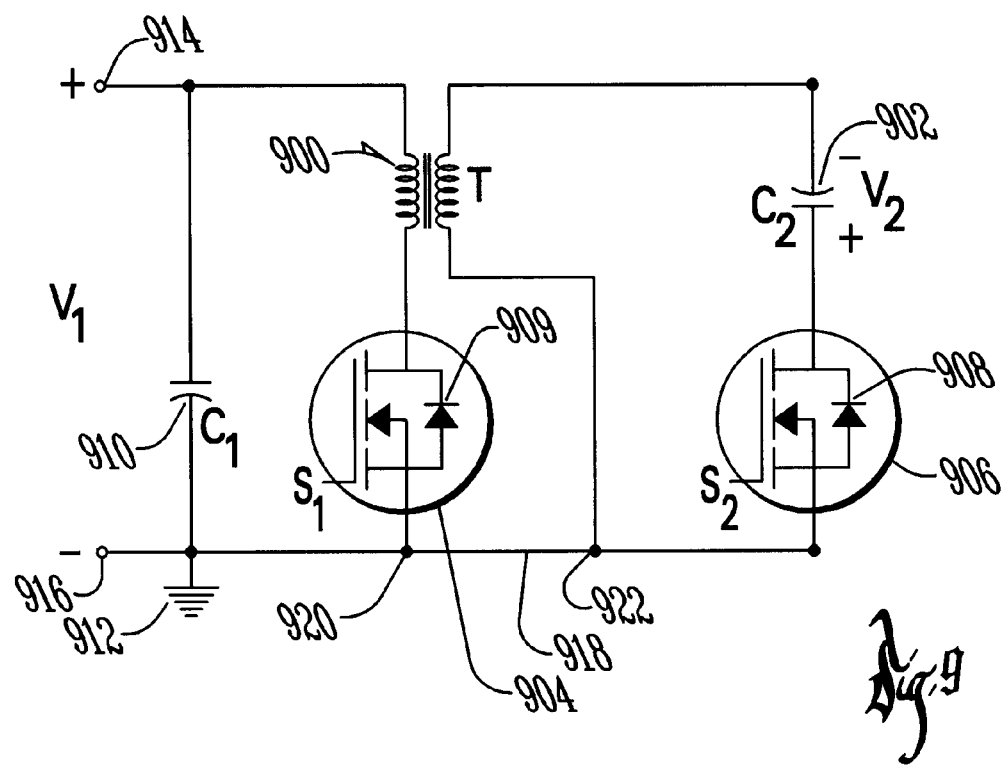
FIG. 9 is a schematic representation of another embodiment of the bi-directional DC to DC converter of the present invention.

Although FIGS. 4, 8 and 9 and the related, described embodiments appearing throughout this specification include a capacitor (see $C_2$, 400, 800, 902, FIGS. 4, 8 and 9) as the energy storage element, it will be appreciated that any of a variety of energy storage elements can be used with the present invention. For example, the energy storage element (400, 800, 902, FIGS. 4, 8 and 9) can be any of several different types of batteries, electrochemical cells, capacitors or other such devices. Capacitors have been depicted in the figures and description merely for illustrative purposes and not to limit the scope of the invention. The selection of a particular energy storage element technology will be governed by the application for which the invention is employed.

Similarly, although a common reference point (414, 812, 912, FIGS. 4, 8 and 9) is depicted in a specific location in the figures, it will be appreciated that the common reference point between the converter circuit and the control circuit can be placed at any of the nodes of the present invention. Certain relative placements, however, as noted herein, provide added benefits. The location selected for a particular application will be governed by normal design considerations.

In operation, a voltage is applied across the positive and negative direct current supply terminals 416, 418. In the charging mode, energy is transferred from the input $v_1$ to the energy storage element, in this case storage capacitor $C_2$ 400, via the inductive component, in this case via an inductor 402. In one embodiment of the charging mode, switch $S_2$ 406 is held in an off state. Thus, when switch $S_1$ is open, current will pass through the diode 410 of the right-hand sub-circuit.

In another charging mode embodiment, a synchronous rectifier mode of operation is used to achieve higher efficiency. In this embodiment, switch $S_2$ 406 is closed when switch $S_1$ 404 is opened. In the synchronous rectifier embodiment, current will flow from the inductive component to the energy storage element through switch $S_2$ 406 instead of through the diode 410. This mode of operation, utilizing either one or both of the switches as synchronous rectifiers, can be used in the charging and discharging modes associated with any of the various embodiments and inventions presented throughout this specification.

The energy transfer from the input voltage $v_1$ to the storage capacitor $C_2$ 400 is controlled by periodically opening and closing switch $S_1$ 404. Thus, in the charging mode, switch $S_1$ 404 controls the current through the inductor 402 and the inductor 402 is used to transfer energy to the storage capacitor $C_2$ 400. Further, as described below, a hysteretic controller can be used to control the inductor current and the voltage across the storage capacitor $C_2$ 400.

During the charging mode, when switch $S_1$ 404 is closed (on state), current enters the inductor 402 and exits toward the direct current supply terminal 418. Thus, in the embodiment of FIG. 4, when switch $S_1$ 404 is closed, the current can be thought of as flowing in a clockwise direction around the left-hand loop or sub-circuit of the circuit. When switch $S_1$ 404 is subsequently opened (placed in an off state), current will exit the inductor 402 and flow toward switch $S_2$ 406. Accordingly, in the embodiment of FIG. 4, when switch $S_1$ 404 is open the current can be thought of as flowing in a counterclockwise direction around the right-hand loop or sub-circuit. Current exiting the inductor 402 is conducted to the storage capacitor $C_2$ 400 by the diode 410, or by switch $S_2$ 406 in the synchronous rectifier mode of operation. As noted, the diode 410 need not be a body diode. Since the current through the inductor 402 is controllable under all normal operational conditions, there is no inrush current problem (such as at first activation when the voltage across capacitor $C_2$ 400 may be zero).

In the discharging mode, energy is transferred from the storage capacitor $C_2$ 400 back to the input 416, 418. The energy transfer from the energy storage element, storage capacitor $C_2$ 400, back to the input is controlled by periodically opening and closing switch $S_2$ 406. Thus, in the discharge mode, switch $S_2$ 406, rather than switch $S_1$ 404, controls the current through the inductor 402. The inductor 402 is used to transfer energy back to the input. Again, a hysteretic controller such as that described below can be used to control the inductor current and the voltage across the input. In both the charging and discharging modes, the inductor current can be easily sensed using a small resistor connected, for example, between the lower end 420 of the inductor 402 and the common reference point 414. It will be appreciated, however, that numerous other current sensing techniques can be employed in this embodiment and in any of the other embodiments and inventions disclosed throughout this specification.

In the discharge mode, when switch $S_2$ 406 is closed, current from the capacitor $C_2$ 400 passes through switch $S_2$ and then through the inductor 402. Thus, in the embodiment of FIG. 4, when switch $S_2$ 406 is closed, the current can be thought of as flowing in a clockwise direction around the right-hand sub-circuit. When switch $S_2$ 406 is subsequently opened, current will exit the inductor 402 and pass through the diode 408, or activated switch $S_1$, of the left-hand loop. Thus, when switch $S_2$ 406 is opened, current ceases to flow in a clockwise direction around the right-hand sub-circuit and begins to flow in a counterclockwise direction about the left-hand sub-circuit. Consequently, the converter can supply an uninterrupted supply of energy to the input when the input voltage is lost or reduced.

In one embodiment of the discharge mode, switch $S_1$ 404 is held in an off state. Thus, when switch $S_2$ 406 is open, current will pass through the diode 408 of the left-hand sub-circuit. As noted, the diode 408 need not be a body diode.

In another embodiment, a synchronous rectifier mode of operation is used to achieve higher efficiency. In this embodiment, switch $S_1$ 404 is closed when switch $S_2$ 406 is opened. In the synchronous rectifier embodiment, current will flow from the inductive component to the input through switch $S_1$ 404 instead of through the diode 408.

Figure 5:
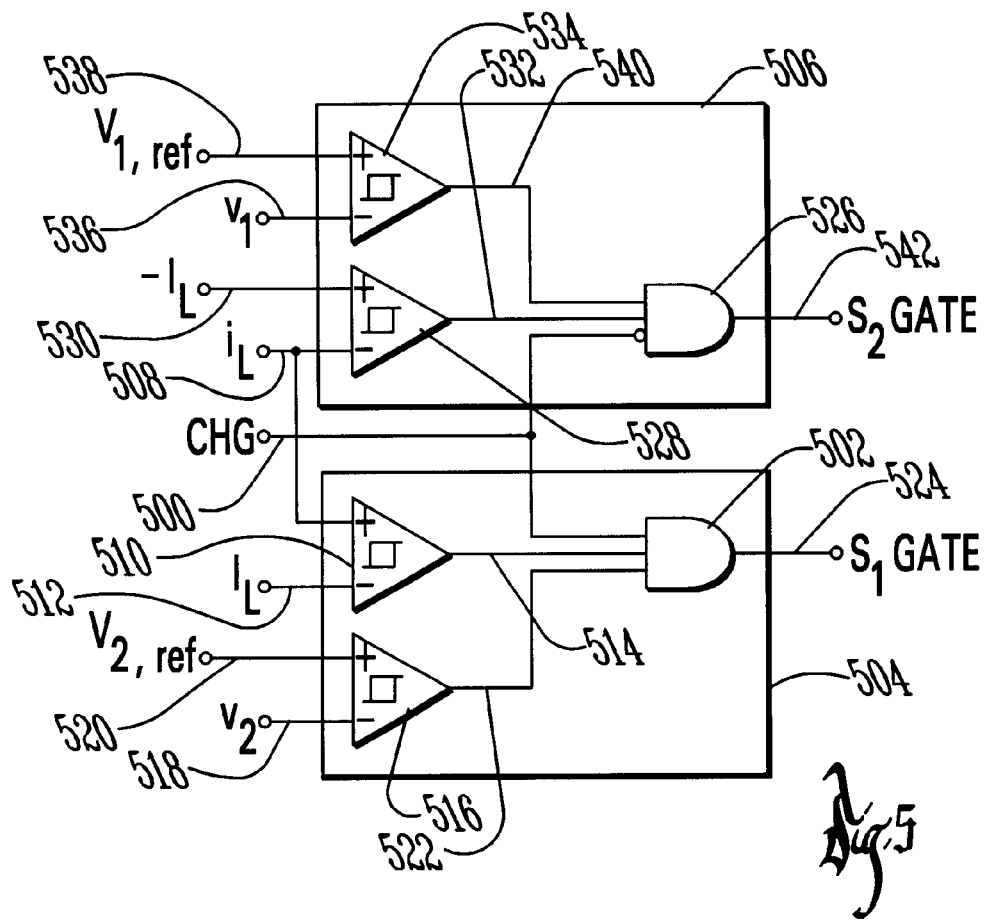
FIG. 5 depicts an embodiment of a hysteretic control structure for the bi-directional DC to DC converter.

FIG. 5 depicts an embodiment of a hysteretic control structure that can be used with the bi-directional DC to DC converter circuit. Additional circuitry (not shown) generates a charge/discharge signal (CHG) on the charge line 500. The CHG signal determines, by indicating a CHG high or low state, whether the converter will operate in the charging or discharging mode. For instance, CHG HIGH can enable a charging mode of operation while CHG LOW can be used to enable a discharging mode. The CHG signal is provided as an input to a three input AND gate 502. The charging mode of operation is managed by the charge control structure 504 and the discharging mode is managed by the discharge control structure 506.

The sensed inductor current is indicated via the $i_L$ line 508. In the charge control structure 504, the sensed inductor current on the $i_L$ line 508 is compared by a first charging control comparator 510 to a reference inductor current level on the $I_L$ line 512. If the comparator 510 determines that the sensed inductor current on the $i_L$ line 508 has reached or exceeded a specified maximum inductor current level, it will signal on its output line 514 that switch $S_1$ (see 404, FIG. 4; 804, FIG. 8 or 904, FIG. 9 for example) should be opened. Alternatively, if the comparator 510 determines that the sensed inductor current on the $i_L$ line 508 has fallen to or below a specified minimum inductor current level, it will signal on its output line 514 that switch $S_1$ should be closed. The comparator's output line 514 supplies the second input to the three input AND gate 502.

A second comparator 516 of the charge control structure 504 compares the sensed voltage across the energy storage element, for example storage capacitor $C_2$ (see 400, FIG. 4; 800, FIG. 8 or 902, FIG. 9 for example), supplied on the $v_2$ line 518, and a reference charging voltage level, supplied on the $v_{2,\,ref}$ line 520. If the second comparator 516 determines that the sensed voltage level on the $v_2$ line 518 has reached or exceeded a specified maximum voltage level, it will signal on its output line 522 that switch $S_1$ should be opened. Alternatively, if the second comparator 516 determines that the voltage level on the $v_2$ line 518 has fallen to or below a specified minimum voltage level, it will signal on its output line 522 that switch $S_1$ should be closed. The second comparator's output line 522 supplies the third input to the three input AND gate 502.

The three input AND gate 502 is coupled with the gate drive of switch $S_1$ (see 404, FIG. 4; 804, FIG. 8 or 904, FIG. 9 for example) by the AND gate output line 524. The three input AND gate 502 will output a signal closing switch $S_1$ only when the signal on the CHG line 500 indicates the charging mode and both of the comparators 510, 516 indicate that switch $S_1$ should be closed. Thus, if the energy storage element has already been sufficiently charged, switch $S_1$ will remain open even if it is indicated by the first comparator 510 that the sensed current through the inductive component has reached the minimum level. If the energy storage element voltage level has not reached the specified maximum voltage level, then switch $S_1$ will be opened and closed in response to the cycling of the sensed inductor current, as governed by the first comparator 510, until the maximum voltage level has been achieved. In the latter instance, to support the synchronous rectifier mode of operation, the hysteretic control structure is modified to include the action of opening switch $S_2$ whenever switch $S_1$ is closed and closing switch $S_2$ whenever switch $S_1$ is opened in response to the cycling of the sensed current through the inductive component.

The discharge control structure 506 operates in a fashion similar to that of the charge control structure 504. The negated CHG signal on the charge line 500 serves as the first input of a second three input AND gate 526. In the discharge control structure 506, the sensed current on the $i_L$ line 508 is compared by a first discharge control comparator 528 to a reference current level on the $-I_L$ line 530. If the comparator 528 determines that the sensed current on the $i_L$ line 508 has reached or exceeded a specified maximum current level, it will signal on its output line 532 that switch $S_2$ (see 406, FIG. 4; 806, FIG. 8 or 906, FIG. 9 for example) should be opened. Alternatively, if the first discharge comparator 528 determines that the sensed current on the $i_L$ line 508 has fallen to or below a specified minimum current level, it will signal on its output line 532 that switch $S_2$ should be closed. The first discharge comparator's output line 532 supplies the second input to the three input AND gate 526.

A second discharge comparator 534 of the discharge control structure 506 compares the sensed voltage across the $v_1$ input (see FIG. 4, FIG. 8 or FIG. 9 for example), supplied on the $v_1$ line 536, and a reference discharging voltage level, supplied on the $v_{1,\,ref}$ line 538. If the second discharge comparator 534 determines that the sensed voltage level on the $v_1$ line 536 has reached or exceeded a specified maximum voltage level, it will signal on its output line 540 that switch $S_2$ should be opened. Alternatively, if the second discharge comparator 534 determines that the voltage level indicated on the $v_1$ line 536 has fallen to or below a specified minimum voltage level, it will signal on its output line 540 that switch $S_2$ should be closed. The second discharge comparator's output line 540 supplies the third input to the second three input AND gate 526.

The second three input AND gate 526 is coupled with the gate drive of switch $S_2$ (see 406, FIG. 4; 806, FIG. 8 or 906, FIG. 9 for example) by the AND gate output line 542. The second three input AND gate 526 will output a signal closing switch $S_2$ only when the negated signal on the CHG line 500 indicates the discharging mode and both of the discharge comparators 528, 534 indicate that switch $S_2$ should be closed. Thus, if the $v_1$ input voltage has reached or exceeded the specified maximum voltage level, switch $S_2$ will remain open even if the first discharge comparator 528 indicates that the sensed current through the inductive component has reached the minimum level.

If the $v_1$ input voltage has not reached the specified maximum voltage level, then switch $S_2$ will be opened and closed in response to the cycling of the sensed inductor current, as governed by the first discharge comparator 528, until the maximum voltage level has been achieved. To support the synchronous rectifier mode of operation, the hysteretic control structure is modified to include the action of opening switch $S_1$ whenever switch $S_2$ is closed and closing switch $S_1$ whenever switch $S_2$ is opened in response to the cycling of the sensed inductor current. It is also important to note that the reference values indicated on the $-I_L$ and $v_{1,\,ref}$ lines 530, 538 can, and often will, be different than the reference values indicated on the $I_L$ and $v_{2,\,ref}$ lines 512, 520.

Figure 6:
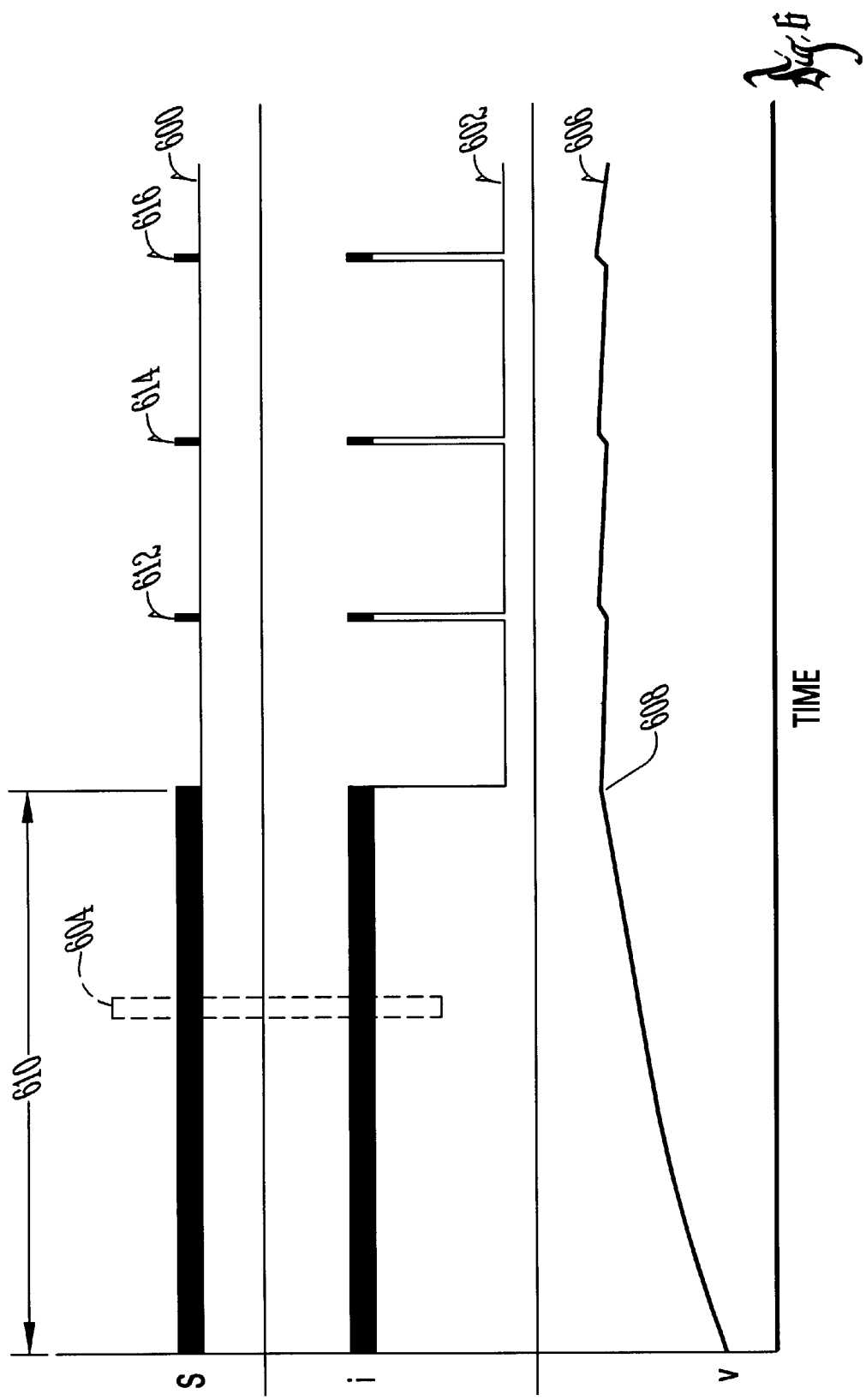
FIG. 6 depicts a collection of synchronized waveforms illustrating the operation of the present invention.
Figure 7:
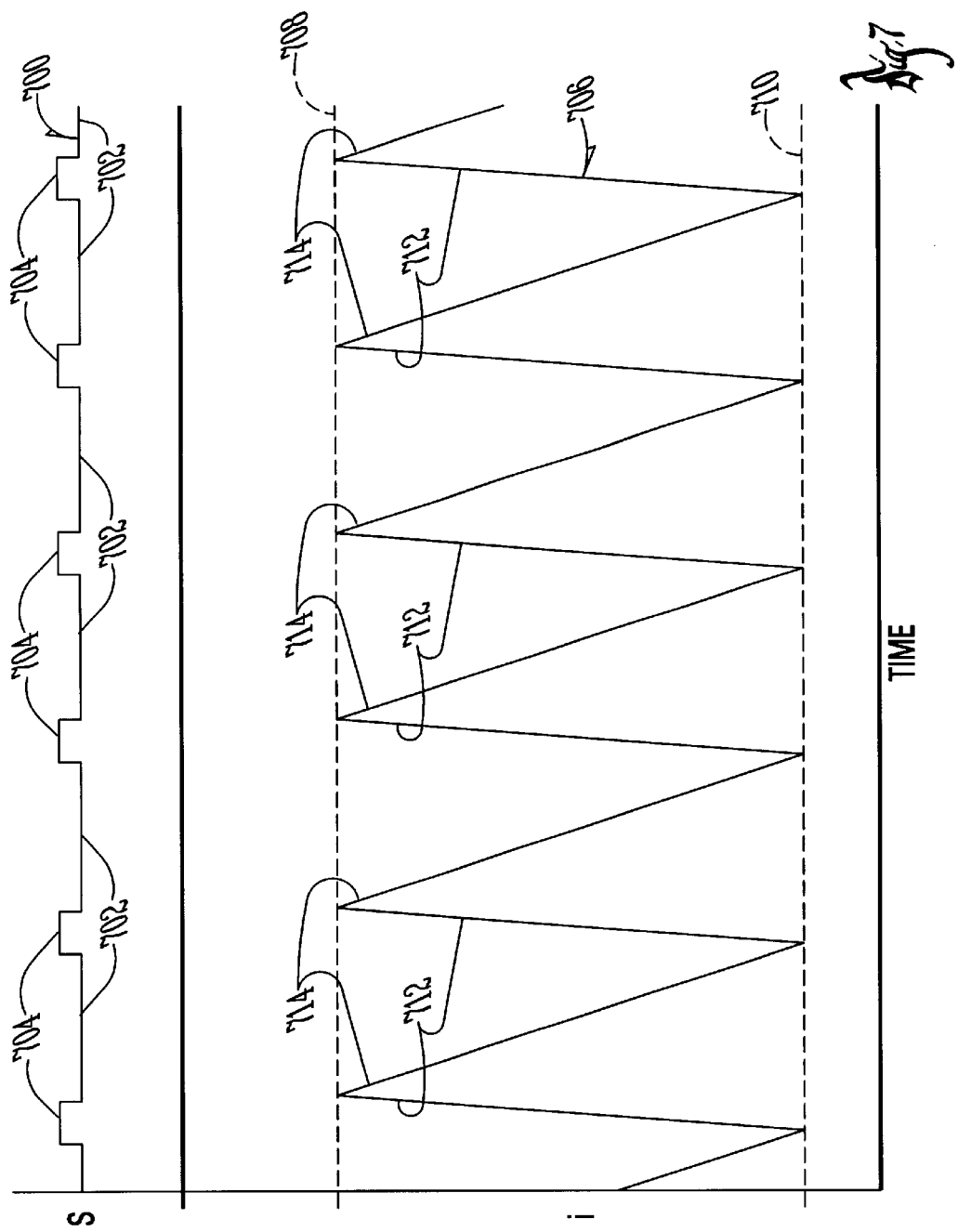
FIG. 7 depicts a magnified view of a portion of two of the waveforms depicted in FIG. 6.

FIG. 6 depicts waveforms illustrating the operation of the present invention in the charging mode during a given time window. It is also applicable, however, to operation in the discharging mode. The top waveform 600 indicates the opening and closing of the controlling switch, for example switch $S_1$ as controlled by the output of the charging control structure (see 524, FIG. 5 for example). The middle waveform 602 indicates the cycling of the sensed inductor current as it responds to the opening and closing of switch $S_1$ (or switch $S_2$ when in the discharging mode). The scale used to depict the waveforms in FIG. 6 causes the many slope changes in the top two waveforms 600, 602 to appear as a black bar. FIG. 7 has been included to present a magnified and more detailed view of a portion 604 of the black bar area. The bottom waveform 606 indicates the voltage across the energy storage element as it is charged from current supplied by the inductive component. (In the discharging mode, the bottom waveform 606 can be interpreted as representing the maintenance, in a specific application, of a $v_1$ input voltage level as a consequence of the switch action depicted in the top waveform 600.)

At the point 608 that an initial charging period 610 reaches the specified maximum voltage level, the charge control structure causes charging to be suspended until the sensed energy storage element voltage level falls to the specified minimum level. At the point 612 that the minimum voltage level is reached, switch $S_1$ (or switch $S_2$, if in the discharging mode) is again repeatedly opened and closed in response to the sensed current until the maximum voltage level is re-attained. This charging mode (or discharging mode) maintenance sequence is reinitiated 614, 616 whenever the minimum voltage level is reached.

FIG. 7 depicts a magnified view of a portion 604 of the initial charging period 610 of FIG. 6. The activity depicted in FIG. 7 also occurs during each of the subsequent maintenance sequences 612, 614, 616. The top waveform 700 depicts the opening 702 and closing 704 of switch $S_1$ (or switch $S_2$, if in the discharging mode). The bottom waveform 706 depicts the cycling of the inductor current, in response to the opening and closing of the switch, between the specified maximum level 708 and minimum level 710.

When the controlling switch is closed 704, the current level rises 712 until the maximum current level 708 is reached. Upon reaching the maximum current level 708, the controlling switch is opened 702 and the current level falls 714 until the minimum current level 710 is reached. This cycling is repeated until the desired maximum voltage level is obtained.

FIG. 8 depicts another embodiment of a bi-directional DC to DC converter in accord with the teachings of the present invention. In this embodiment, switch $S_1$ has been moved from the location indicated in FIG. 4. The circuit includes a capacitor $(C_2)$ 800 as the energy storage element, an inductor (L) 802, two switches $(S_1, S_2)$ 804, 806 and two diodes 808, 809. As noted, other types of components can be used in place of the capacitor as an energy storage element. The circuit further includes a connection to a common reference point 812, as well as a power source connector structure having a positive direct current supply lead 814 and a negative direct current supply lead 816.

A filtering capacitor $(C_1)$ 412, 810, 910 is depicted in FIGS. 4, 8 and 9. The filtering capacitor need not be included in the circuits however. Alternatively, it may be integrated with the input voltage source in any of the embodiments presented in this specification.

In one embodiment, switches $S_1$ and $S_2$ 804, 806 are both N-channel MOSFETs. As in the embodiment of FIG. 4, the component orientation of FIG. 8 has the benefit of permitting use of simple gate drive mechanisms. For example, both switches can be driven using a standard, integrated half-bridge driver. It will be appreciated, however, that other types of switches and drivers can also be used. For example, BJTs, IGBTs, MCTs and GTOs can be used for the $S_1$ 804 and $S_2$ 806 switches. Accordingly, the term switch is used in a broad sense to include all such types of appropriate switch components and not just the switches depicted in the figures or listed above for illustrative purposes.

As in FIG. 4, the diodes 808, 809 of FIG. 8 are depicted as body diodes of the switches $S_1$ 804 and $S_2$ 806. The diodes 808, 809, however, need not be included as an integrated feature of the switch. They each, for example, may be a separate component that is also connected in parallel with their respective switch 804, 806.

Operation of the embodiment of FIG. 8 is essentially the same as that described above in relation to FIG. 4. Further, the descriptions of the hysteretic control structure and the waveforms provided in relation to FIGS. 5, 6 and 7 above, are also fully applicable to the embodiment of FIG. 8.

In operation, a voltage is applied across the positive and negative direct current supply leads 814, 816. In the charging mode, energy is transferred from the $v_1$ input to the energy storage element, capacitor $C_2$ 800, via the inductor 802. In one embodiment of the charging mode, switch $S_2$ 806 is held in an off state. Thus, when switch $S_1$ 804 is open, current will pass through the diode 809 of the right-hand sub-circuit.

In another charging mode embodiment, a synchronous rectifier mode of operation is used to achieve higher efficiency. In this embodiment, switch $S_2$ 806 is closed when switch $S_1$ 804 is opened. In the synchronous rectifier embodiment, current will flow from the inductive component to the energy storage element through switch $S_2$ 806 instead of through the diode 809.

The energy transfer from the input voltage $v_1$ to the energy storage element, capacitor $C_2$ 800, is controlled by periodically opening and closing switch $S_1$ 804. Thus, in the charging mode, switch $S_1$ 804 controls the current through the inductor 802 and the inductor 802 is used to transfer energy to the storage capacitor $C_2$ 800. Further, as described in detail above, a hysteretic controller can be used to control the inductor current and the voltage across the storage capacitor $C_2$ 800. The inductor current can be sensed, for example, via use of a current transformer.

When switch $S_1$ 804 is closed, current enters the inductor 802 and exits toward the direct current supply lead 816. Thus, in the embodiment of FIG. 8, when switch $S_1$ 804 is closed, the current can be thought of as flowing in a clockwise direction around the left-hand loop of the circuit. When switch $S_1$ 804 is open, current exits the inductor 802 and flows toward switch $S_2$ 806. Accordingly, in the embodiment of FIG. 8, when switch $S_1$ 804 is open, the current can be thought of as flowing in a counterclockwise direction around the right-hand sub-circuit. Current exiting the inductor 802 is conducted to the storage capacitor $C_2$ 800 by the diode 809, or by switch $S_2$ 806 in the synchronous rectifier mode of operation. As noted, the diode 809 need not be a body diode. Since the current through the inductor 802 is controllable under all normal operational conditions, there is no inrush current problem (such as at first activation when the voltage across capacitor $C_2$ 800 may be zero).

In the discharging mode, energy is transferred from the storage capacitor $C_2$ 800 back to the $v_1$ input. The energy transfer from the energy storage element, capacitor $C_2$ 800, to the $v_1$ input is controlled by periodically opening and closing switch $S_2$ 806. Thus, in the discharge mode, switch $S_2$ 806, rather than switch $S_1$ 804, controls the current through the inductor 802. The inductor 802 is used to transfer energy back to the input. Again, a hysteretic controller such as that described above in relation to FIGS. 5, 6 and 7 can be used to control the inductor current and the voltage across the input.

When switch $S_2$ 806 is closed, current from the capacitor $C_2$ 800 passes through switch $S_2$ 806 and then through the inductor 802. Thus, in the embodiment of FIG. 8, when switch $S_2$ 806 is closed, the current can be thought of as flowing in a clockwise direction around the right hand loop of the circuit. When switch $S_2$ 806 is open, current exits the inductor 802 toward the current supply lead 814 and passes through the diode 808, or activated switch $S_1$, of the left-hand sub-circuit. Thus, when switch $S_2$ 806 is opened, current ceases to flow in a clockwise direction around the right-hand sub-circuit and begins to flow in a counterclockwise direction about the left-hand sub-circuit. Consequently, an uninterrupted supply of energy can be supplied.

In one embodiment of the discharge mode, switch $S_1$ 804 is held in an off state. Thus, when switch $S_2$ 806 is open, current will pass through the diode 808 of the left-hand loop. As noted, the diode 808 need not be a body diode.

In another embodiment, a synchronous rectifier mode of operation is used to achieve higher efficiency. In this embodiment, switch $S_1$ 804 is closed when switch $S_2$ 806 is opened. In the synchronous rectifier embodiment, current will flow from the inductive component to the input and through switch $S_1$ 804 instead of through the diode 808.

FIG. 9 depicts a transformer-coupled embodiment of the bi-directional DC to DC converter of the present invention. This embodiment can be used when energy is to be stored at a voltage that is significantly greater than (or, if desired, significantly less than) the $v_1$ input voltage. The structure and functioning of this embodiment is similar to that described in relation to the embodiments of FIGS. 4 and 8. In the embodiment of FIG. 9, however, the inductive component is a transformer 900 that is intended to store energy as well as to provide the ability to step the voltage up or down.

The circuit of FIG. 9 includes a capacitor ($C_2$) 902 for storing energy, the transformer (T) 900, two switches ($S_1$, $S_2$) 904, 906 and two diodes 908, 909. A filtering capacitor ($C_1$) 910, which need not be included in the circuit, is also depicted. The circuit further includes a connection to a common reference point 912, and, as in FIGS. 4 and 8, a power source connector structure including a positive direct current supply terminal or lead 914 and a negative direct current supply terminal or lead 916.

In one embodiment of this circuit, switches $S_1$ and $S_2$ 904, 906 are both N-channel MOSFETs. It will be appreciated, however, that other types of switches can also be used. For example, BJTs, IGBTs, MCTs and GTOs can be used for the $S_1$ 904 and $S_2$ 906 switches. Accordingly, the term switch is used in a broad sense to include all such types of appropriate switch components and not just the switches depicted in the figures or listed above for illustrative purposes.

As noted in relation to FIG. 4, the switches 904, 906 can alternatively be located at different locations in the circuit. For example, switch $S_1$ 904 and its related diode 909 can be located between the negative direct current supply lead 914 and the transformer winding of the left-hand sub-circuit. Similarly, switch $S_2$ 906 and its related diode 908 can be located between the negative plate of the storage capacitor $C_2$ 902 and the transformer winding of the right-hand sub-circuit.

As with the embodiment of FIGS. 4 and 8, the component orientation of FIG. 9 has the benefit of permitting the use of simple gate drive mechanisms. An additional advantage of this circuit over the embodiments of FIGS. 4 and 8, however, is that the source of both switches 904, 906 is coupled to the common point of reference. Additionally, current sensing resistors referenced to the common point of reference can be put in series with each switch to simplify current sensing. This orientation further simplifies the gate drive. The conductive coupling 918 between the left-hand sub-circuit, at point 920, and the right-hand sub-circuit, at point 922, is an optional feature. Although this coupling 918, in cooperation with the depicted relative locations of switch $S_2$ 906 and switch $S_1$ 904, provides benefits as noted above, it will be appreciated that other embodiments need not include this feature.

As in FIGS. 4 and 8, the diodes 908, 909 of FIG. 9 are depicted as body diodes of the switches 904, 906. The diodes 908, 909, however, need not be included as an integrated feature of each switch. They each, for example, may be a separate component that is connected in parallel with its respective switch 904, 906.

Operation of the embodiment of FIG. 9 is generally the same as that described above in relation to FIGS. 4 and 8. The most significant differences result from the use of the transformer 900 instead of the inductor 402, 802 for the inductive component. The descriptions of the hysteretic control structure and the waveforms provided in relation to FIGS. 5, 6 and 7 above, are also applicable to the embodiment of FIG. 9.

In applying the teachings of FIGS. 5, 6 and 7 to the embodiment of FIG. 9, the inclusion of the transformer 900 requires that the following adjustments be made to the description relating to FIGS. 5, 6 and 7. Referring to the hysteretic control structure of FIG. 5, the first comparator 510 and the first discharge comparator 528 will compare the sensed transformer current ($i_T$) to reference transformer currents $I_T$ and $-I_T$, respectively, instead of comparing a sensed inductor current $i_L$ to references $I_L$ and $-I_L$.

Similarly, in relating FIGS. 6 and 7 to the embodiment of FIG. 9, the middle waveform 602 of FIG. 6 and the bottom waveform 706 of FIG. 7 should be interpreted as representing sensed transformer current ($i_T$) rather than sensed inductor current ($i_L$). In a charging mode of operation, the rising portion 712 of the waveform 706 represents the current sensed on the primary winding of the transformer and the failing portion 714 of the waveform 706 represents the current on the transformer's secondary winding. The waveform 706 represented in FIG. 7 would result from a transformer having a 1 to 1 turn ratio. Different turn ratios would result in differently proportioned waveforms, but the basic relation illustrated in FIGS. 6 and 7 between state of the switch and the cycling of the current remains applicable.

In operation, a voltage is applied across the positive and negative direct current supply leads 914, 916. In the charging mode, energy is transferred from the $v_1$ input to the energy storage element, capacitor $C_2$ 902, via the transformer 900. As in the various embodiments presented above, in one charging mode of operation, switch $S_2$ 906 is held in an off state. Thus, when switch $S_1$ 904 is open, current will pass through the diode 908 of the right-hand sub-circuit. As noted, the diode 908 need not be a body diode.

In another charging mode embodiment, a synchronous rectifier mode of operation is used to achieve higher efficiency in this embodiment, switch $S_2$ 906 is closed when switch $S_1$ 904 is opened. In the synchronous rectifier embodiment, current will flow through switch $S_2$ 906 instead of through the diode 908.

The transformer 900 functions to significantly increase (or, if desired, decrease) the voltage. The energy transfer from the input voltage $v_1$ to the storage capacitor $C_2$ 902 is controlled by periodically opening and closing switch $S_1$ 904. Thus, in the charging mode, switch $S_1$ 904 controls the current into the transformer 900. The transformer 900 is then used to transfer energy to the storage capacitor $C_2$ 902.

The opening and closing of switch $S_1$ in the charging mode and of switch $S_2$ in the discharging mode provides the current variation required to cause the transformer 900 to function as desired in the DC environment. Further, as described in detail above, a hysteretic controller can be used to control the transformer current and the voltage across the storage capacitor $C_2$ 902. The transformer current can be sensed in this embodiment via use, for example, of two resistors.

In the charging mode, when switch $S_1$ 904 is closed, current enters the transformer 900 and exits, through switch $S_1$ 904, toward the direct current supply lead 916. Thus, in the embodiment of FIG. 9, when switch $S_1$ 904 is closed, the current can be thought of as flowing in a clockwise direction around the left-hand loop of the circuit. When switch $S_1$ 904 is open, current exits the transformer winding coupled with the right-hand loop and flows toward switch $S_2$ 906. Accordingly, in the embodiment of FIG. 9, when switch $S_1$ 904 is open, the current can be thought of as flowing in a counterclockwise direction around the right-hand sub-circuit. Current exiting the transformer 900 is conducted to the energy storage element, capacitor $C_2$ 902, by the diode 908, or by switch $S_2$ 906 in a synchronous rectifier mode of operation. Since the current through the transformer 900 is controllable under all normal operational conditions, there is no inrush current problem (such as at first activation when the voltage across capacitor $C_2$ 902 may be zero).

In the discharging mode, energy is transferred from the storage capacitor $C_2$ 902 back to the $v_1$ input 914, 916. The energy transfer from the storage capacitor $C_2$ 902 to the $v_1$ input is controlled by periodically opening and closing switch $S_2$ 906. Thus, in the discharge mode, switch $S_2$ 906, rather than switch $S_1$ 904, controls the current into the transformer 900.

The transformer 900 is used in the discharging mode to transfer energy back to the input. Again, a hysteretic controller such as that described above can be used to control the transformer current and the voltage across the input. When switch $S_2$ 906 is closed, current from the capacitor $C_2$ 902 enters the transformer winding coupled with the right-hand loop. Thus, in the embodiment of FIG. 9, when switch $S_2$ 906 is closed, the current can be thought of as flowing in a clockwise direction around the right hand loop of the circuit. When switch $S_2$ 906 is open, current exits the transformer winding coupled with the left-hand sub-circuit and flows toward the current supply terminal or lead 914 and through the diode 909 (or activated switch $S_1$ 904 in the synchronous rectifier mode). Thus, when switch $S_2$ 906 is opened, current ceases to flow in a clockwise direction around the right-hand loop and begins to flow in a counter-clockwise direction about the left-hand loop. Consequently, an uninterrupted supply of energy can be supplied.

In one embodiment of the discharge mode, switch $S_1$ 904 is held in an off state. Thus, when switch $S_2$ 906 is open, current will pass through the diode 909 of the left-hand loop. The diode 909 need not be a body diode.

In another discharge mode embodiment, the synchronous rectifier mode of operation is used to achieve higher efficiency. In this embodiment, switch $S_1$ 904 is closed when switch $S_2$ 906 is opened. In the synchronous rectifier embodiment, current flows from the inductive component to the input 914 and through switch $S_1$ 904 instead of through the diode 909.

In each of the embodiments of the invention presented throughout this specification, current flows through only one sub-circuit at any given time. Current either flows about the left-hand sub-circuit (involving the first switch or diode, the power source connector structure and the inductive component), or about the right-hand loop or sub-circuit (involving the second switch or diode, energy storage element and the inductive component), but not about both sub-circuits simultaneously. When current is flowing about the right-hand sub-circuit, the power source connector structure of the left-hand sub-circuit is not involved in the circulation. In the present inventions, the inductive component is located to accomplish the energy transfer between the two sub-circuits. The energy storage element is coupled with the $v_1$ input via the inductive component.

While the present invention in its various forms and embodiments is useful in the uninterrupted power supply applications described above, it also has uses in several other types of applications. It can be used, for example, in the applications described in the Background of the Invention and the Summary of the Invention sections of this specification. In addition, it is useful in battery charging and discharging applications, including such applications that do not provide or require an uninterrupted power supply. The present invention is not intended to be limited to only those applications supplying an uninterrupted supply of power.

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely exemplary embodiments thereof.

What is claimed is:

1. An energy storage module, comprising:
 a bi-directional circuit, comprising:
  a first sub-circuit, comprising:
   a power source connector structure, comprising a power connector first lead and a power connector second lead, to connect said first sub-circuit to an electrical power supply, said power connector first lead to receive electrical energy having a polarity opposite that to be received by said power connector second lead;
   an inductive component, comprising an inductive component first connector and an inductive component second connector, said inductive component first connector coupled with said power connector first lead;
   a first switch, capable of bi-directional current flow, comprising a first switch first lead and a first switch second lead, said first switch first lead coupled with said power connector second lead, said first switch second lead coupled with said inductive component second connector, said first switch being switchable between a non-conducting state, wherein current cannot flow in said first sub-circuit from said power source connector structure to said inductive component, and a conducting state, wherein current can flow from said power source connector structure to said inductive component; and
   a first diode, coupled in parallel with said first switch, comprising a first diode anode and a first diode cathode, said first diode oriented to prevent flow of current from said power source connector structure to said inductive component when said first switch is in said non-conducting state; and
  a second sub-circuit, comprising:
   an energy storage element, comprising a storage element first lead and a storage element second lead, said storage element first lead having a polarity opposite that of energy to be received by said power connector first lead, said storage element second lead having a polarity opposite that of energy to be received by said power connector second lead, said storage element first lead coupled with said inductive component first connector, said storage element second lead coupled with said inductive component second connector;
   a second diode, comprising a second diode anode and a second diode cathode, said second diode oriented on said second sub-circuit so as to permit charging of said energy storage element with current transferred from said inductive component and to prevent passage through said second diode of current discharged from said energy storage element; and
   a second switch, capable of bi-directional current flow, coupled in parallel with said second diode, comprising a second switch first lead coupled with said second diode cathode and a second switch second lead coupled with said second diode anode, said second switch having a non-conducting state wherein current cannot flow in said second sub-circuit from said energy storage element to said inductive component, and a conducting state wherein current can flow from said energy storage element to said inductive component; and
  a variable frequency control component, controlling said first switch to direct current from said power source connector structure to said inductive component in a charging mode and controlling said second switch to direct current from said energy storage element to said inductive component in a discharging mode of operation, said variable frequency control component controlling said bi-directional circuit such that current does not flow between said power source connector structure and said inductive component when current is flowing about said second sub-circuit.

2. The energy storage module of claim 1, wherein said inductive component comprises an inductor.

3. The energy storage module of claim 1, wherein said inductive component comprises a transformer, said transformer comprising a first winding and a second winding, said first winding comprising a first winding first lead and a first winding second lead, said second winding comprising a second winding first lead and a second winding second lead, said inductive component first connector comprising said first winding first lead and said second winding first lead, said inductive component second connector comprising said first winding second lead and said second winding second lead, wherein said inductive component is coupled with said power connector first lead via said first winding first lead, wherein said inductive component is coupled with said first switch second lead via said first winding second lead, wherein said inductive component is coupled with said storage element first lead via said second winding first lead, and wherein said inductive component is coupled with said storage element second lead via said second winding second lead.

4. The energy storage module of claim 1, wherein said variable frequency control component includes functionality to operate said second switch in a closed manner such that it performs a rectification process.

5. The energy storage module of claim 1, wherein said energy storage element comprises a capacitor.

6. The energy storage module of claim 1, further comprising an input voltage source coupled with said power source connector structure.

7. The energy storage module of claim 1, wherein said power connector first lead is to transfer energy having a positive polarity and said power connector second lead is to transfer energy having a negative polarity, and wherein said first diode anode is directly coupled with said power connector second lead and said first diode cathode is coupled with said power connector first lead via said inductive component.

8. The energy storage module of claim 1, wherein said power connector first lead is to transfer energy having a negative polarity and said power connector second lead is to transfer energy having a positive polarity, and wherein said first diode cathode is directly coupled with said power connector second lead and said first diode anode is coupled with said power connector first lead via said inductive component.

9. The energy storage module of claim 7, wherein said second diode anode is directly coupled with said storage element first lead, and wherein said second diode cathode is coupled with said storage element second lead via said inductive component.

10. The energy storage module of claim 7, wherein said second diode cathode is directly coupled with said storage element second lead, and wherein said second diode anode is coupled with said storage element first lead via said inductive component.

11. The energy storage module of claim 8, wherein said second diode cathode is directly coupled with said storage element first lead, and wherein said second diode anode is coupled with said storage element second lead via said inductive component.

12. The energy storage module of claim 8, wherein said second diode anode is directly coupled with said storage element second lead, and wherein said second diode cathode is coupled with said storage element first lead via said inductive component.

13. The energy storage module of claim 3, wherein said power connector first lead is to transfer energy having a positive polarity and said power connector second lead is to transfer energy having a negative polarity, wherein said first diode anode is directly coupled with said power connector second lead and said first diode cathode is coupled with said power connector first lead via said inductive component; and wherein said second diode cathode is directly coupled with said storage element second lead, said second diode anode is coupled with said storage element first lead via said inductive component, and said second switch second lead is conductively coupled with said power connector second lead; and further comprising a common point of reference, located between said power connector second lead and said second switch second lead.

14. The energy storage module of claim 10, further comprising a common point of reference, located between said power connector second lead and said first switch first lead; and further comprising a half-bridge driver coupled with said second switch.

15. The energy storage module of claim 1, wherein said first switch and said first diode are contained in a single electrical component.

16. The energy storage module of claim 15, wherein said single electrical component is a MOSFET.

17. The energy storage module of claim 15, wherein said second switch and said second diode are contained in an additional single electrical component.

18. The energy storage module of claim 17, wherein said additional single electrical component is a MOSFET.

19. The energy storage module of claim 17, wherein said single electrical component is a P-channel MOSFET and wherein said additional single electrical component is an N-channel MOSFET.

20. The energy storage module of claim 4, wherein said variable frequency control component further includes functionality to operate said first switch in a closed manner such that it performs a rectification process.

21. A method of operating a bi-directional energy storage module, comprising the steps of:
   directing electrical current from a voltage source to an inductive component;
   monitoring current passing through said inductive component;
   ceasing to direct electrical current through said inductive component upon determining that current passing through said inductive component has reached a specified maximum level;
   conducting, after said ceasing to direct step, electrical current exiting said inductive component to an energy storage element;
   monitoring voltage level across said energy storage element;
   re-directing electrical current from said voltage source to said inductive component upon determining that current passing through said inductive component has fallen to a specified minimum level; and
   suspending transfer of current to said energy storage element upon determining that voltage across said energy storage element has reached a specified maximum voltage level.

22. The method of claim 21, further comprising the step of re-initiating transfer of current to said energy storage element upon determining that voltage across said energy storage element has fallen to a specified minimum voltage level.

23. The method of claim 21, further comprising the step of signaling a charging mode of operation.

24. The method of claim 21, wherein said monitoring current step comprises comparing sensed current through said inductive component with a reference value.

25. The method of claim 21, wherein said conducting step comprises closing a switch located in a sub-circuit containing said inductive component and said energy storage element.

26. The method of claim 21, further comprising the step of signaling a discharging mode of operation upon determining that voltage across said voltage source has fallen to a minimum voltage source voltage level.

27. The method of claim 26, further comprising the steps of:
   discharging electrical current from said energy storage element to said inductive component;
   ceasing to discharge electrical current from said energy storage element to said inductive component upon determining that current passing through said inductive component has reached a specified maximum level;
   transferring, after said ceasing to discharge step, electrical current exiting said inductive component to said voltage source;

re-discharging electrical current from said energy storage element to said inductive component upon determining that current passing through said inductive component has fallen to a specified minimum level;

suspending discharge of current to said voltage source upon determining that voltage across said voltage source has reached a specified maximum voltage level; and re-initiating discharge of current to said voltage source upon determining that voltage across said voltage source has fallen to a specified minimum voltage level.

28. An energy storage module, comprising:

bi-directional circuit means for permitting charging and discharging operation of the energy storage module, comprising;

inductive component means for receiving and transferring electrical energy;

storage element means for storing electrical energy;

first bi-directional sub-circuit means for transferring electrical energy between an input power source and said inductive component means; and second bi-directional sub-circuit means for transferring electrical energy between said storage element means and said inductive component means; and variable frequency control means for controlling discharging mode and charging mode operation of said bi-directional circuit means such that current cannot flow through said first bi-directional sub-circuit means when current is flowing through said second bi-directional sub-circuit means.

* * * * *